United States Patent [19]

Pedain et al.

[11] Patent Number: 5,276,125
[45] Date of Patent: Jan. 4, 1994

[54] HEAT-CURABLE COATING COMPOSITIONS

[75] Inventors: Josef Pedain, Cologne; Wilhelm Thoma; Walter Schröer, both of Leverkusen; Waldemar Kling, Kürten-Bechen; Manfred Dietrich, Leverkusen, all of Fed. Rep. of Germany

[73] Assignee: Bayer Aktiengesellschaft, Leverkusen, Fed. Rep. of Germany

[21] Appl. No.: 616,546

[22] Filed: Nov. 21, 1990

[30] Foreign Application Priority Data

Dec. 2, 1989 [DE] Fed. Rep. of Germany ....... 3939964

[51] Int. Cl.$^5$ .............................................. C08G 18/81
[52] U.S. Cl. .................................. 528/45; 528/44; 528/49; 528/77; 528/81; 528/83; 525/113; 525/114; 525/116
[58] Field of Search ................... 528/44, 45, 49, 77, 528/81, 83; 525/113, 114, 116

[56] References Cited

U.S. PATENT DOCUMENTS

| | | | |
|---|---|---|---|
| 3,634,544 | 1/1972 | Takeda et al. | 260/858 |
| 3,687,715 | 8/1972 | Kigane et al. | 117/76 R |
| 4,034,349 | 7/1977 | Monaco et al. | 364/200 |
| 4,108,814 | 8/1978 | Reiff et al. | 528/71 |
| 4,147,680 | 4/1979 | Reischl et al. | 521/163 |
| 4,248,756 | 2/1981 | Konig et al. | 260/31.2 N |
| 4,367,327 | 1/1983 | Holker et al. | 528/61 |
| 4,409,340 | 10/1983 | Stolzenbach et al. | 528/45 |
| 4,687,830 | 8/1987 | Weber et al. | 528/64 |
| 4,761,434 | 8/1988 | Dietrich et al. | 521/164 |
| 4,894,428 | 1/1990 | Thoma et al. | 528/45 |
| 4,895,883 | 1/1990 | Pedain et al. | 521/159 |

FOREIGN PATENT DOCUMENTS

| | | |
|---|---|---|
| 0100005 | 2/1984 | European Pat. Off. |
| 1220384 | 7/1966 | Fed. Rep. of Germany. |
| 1226071 | 10/1966 | Fed. Rep. of Germany. |
| 257420 | 4/1983 | Japan. |
| 59-36781 | 2/1984 | Japan. |
| 61-9423 | 1/1986 | Japan. |

1288401 9/1972 United Kingdom.

*Primary Examiner*—John Kight, III
*Assistant Examiner*—Duc Truong
*Attorney, Agent, or Firm*—Joseph C. Gil; Thomas W. Roy

[57] ABSTRACT

The present invention relates to heat-curable coating compositions containing

A) a prepolymer having an average of 2–4 ketoxime-blocked NCO groups, having an average moleculer weight of 500–15,000 and prepared from aliphatic, cycloaliphatic and aromatic polyisocyanates and one or more polyhydroxy components which contain 0 to 30% by weight of ethylene oxide units and B) a crosslinking agent of the formula

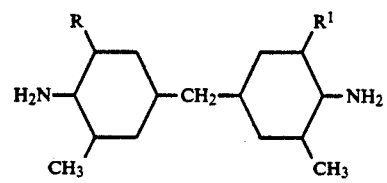

wherein R and $R^1$ represent H or $C_1$–$C_4$-alkyl, the ratio of equivalents of blocked NCO groups in A) to $NH_2$ groups in B) being 1.35:1 to 0.95:1, characterized in that at least one of the polyhydroxy compounds used for the preparation of the prepolymer contains, in stable dispersion, a polyurethane, a polyurethane-urea and/or a polyurea, which is substantially free from NCO groups, hydroxyl groups and amino groups and which are synthesized from aromatic, aliphatic and/or cycloaliphatic diisocyanates and from diamines, hydrazine and/or diols, provided that at least one of these components carries a radical having hydrophilic characteristics.

The present invention also relates to the use of these coating compositions in a process for the coating, particularly water vapor-permeable coating, of substrates, preferably textile sheet-like structures and leather.

10 Claims, No Drawings

HEAT-CURABLE COATING COMPOSITIONS

BACKGROUND OF THE INVENTION

1. Field of the Invention

The present invention relates to coating compositions based on polyurethanes from which water vapor-permeable coatings can be produced.

2. Description of the Prior Art

It is known to prepare vapor-permeable coatings by physical means. In this method the polyurethane, dissolved in a solvent, is applied in the form of a layer to a substrate or to a release-substrate and introduced in the wet state into a bath that contains a non-solvent for the polymer which is miscible with the solvent. The non-solvent penetrates into the solution layer where it gradually precipitates and coagulates the polyurethane. During the drying of the resultant solidified film, the escaping solvent and also the non-solvent leave behind microchannels, which are then available in the coating for the transport of water vapor.

In a similar manner coatings can be produced by admixing salt powders with the polymer solution. After formation of the coatings the salt can be washed out with water leaving microcavities behind.

The perforation of compact foils using high-energy electron beams also leads to films which can be laminated and which possess high water vapor permeability. As a rule the volume of water vapor transported per unit of time and unit of area is more than 10 times as high with a water vapor-permeable coating as with a conventional compact film.

These methods have the disadvantage that they are chemically complicated, require complex apparatus or create considerable waste problems.

Recently a microporous coating has been prepared which does not require immersion bath technology. In this process, also known as evaporation coagulation, water is added to the solution of the polymer in a low-boiling solvent in an amount such that the resultant spreading-paste is just stable and capable of being applied to a suitable substrate. During evaporation the organic solvent escapes first. The continuously increasing proportion of water precipitates out the solid as in the immersion process and finally escapes on drying, leaving behind a microporous structure in the film.

All of these processes have the disadvantage that the microchannels or microcavities cause a weakening of the water vapor-permeable coating, i.e., the tensile strength and abrasion resistance clearly decrease in comparison with a compact film.

Therefore, there have been many attempts to produce water vapor-permeable coatings not only by physical methods, but also by chemical means. It has been proposed to produce such coatings using polyurethanes which partly contain water-soluble or hydrophilic structural components. DE-A-1,220,384 and 1,226,071 describe polyurethanes which contain glycols, diisocyanates and a difunctional hydrophilic structural component, which creates the water vapor permeability of the coating and is a macrodiol. In both cases polyethylene glycol having a molecular weight of about 1000 is used; the two applications differ only in the "vulcanization" mechanism, i.e., the subsequent crosslinking of the polyurethane elastomers.

Compact top coats of composite materials made from textile substrates and microporous coatings, such as those described in DE-OS 2,020,153, are also water vapor-permeable.

Polyethylene glycols can also be used as the diol component for the production of polyester polyols which are subsequently used to prepare polyurethane elastomers as disclosed in Japanese Patent Application 61/009,423. The resulting coatings possess good water vapor permeability and negligible water swelling.

Segmented polyurethane elastomers prepared from polyethylene glycols are also disclosed in EP-A 52,915.

Other organic hydrophilic components may also be added to polyurethanes in order to prepare water vapor-permeable coatings and composite materials. In particular, poly-$\gamma$-methylglutamate can be blended with polyurethanes, chemically incorporated as a structural component, or grafted onto polyurethanes. DE-A 1,922,329 and 1,949,060 and JP-A 58,057,420 and 59/036,781 disclose these alternatives.

Recently, polyurethanes prepared from the above-mentioned polyethylene glycols have been of particular industrial interest for the production of water vapor-permeable compact coatings. These raw materials are inexpensive and commercially available. The polyurethanes and polyurethane-ureas obtained from these raw materials are also well known in principle. In contrast to the widely used polyurethane-ureas, which contain polyesters, polycarbonates or polyethers as macrodiols, these materials are capable of absorbing water, water vapor-permeable, and occasionally even strongly swellable or soluble in water.

For this reason hydrophobic polyols are admixed with the polyethylene glycols having hydrophilic characteristics. From these mixtures polyurethanes or polyurethane-ureas can be prepared which combine good water vapor permeability with good resistance to the effects of liquid water.

Two-component coating compositions containing ketoxime-blocked prepolymers, binuclear, cycloaliphatic diamines as crosslinking agent/curing agent and at most 15% by weight of solvent in the formulation are described in DE-A 2,702,090 and U.S. Pat. No. 4,248,756. In these systems the polyhydroxy compounds used to prepare the blocked prepolymers may contain polypropylene oxides and, where appropriate, ethylene oxide (EOx) units.

Blocked prepolymers, as described in EP-A 100,005, formed from polyhydroxy compounds which contain 20-100% by weight, preferably 40-80% by weight of EOx units may be cured to provide good water-vapor permeable coatings on textile substrates. However, the swelling of these coatings in water leads to the occurrence of pimple-shaped swelling phenomena when discrete drops of water are placed on the coating. For a textile consumer article these are not only an aesthetic fault, but a considerable technical defect.

It is an object of the present invention to provide coating compositions which may be used to prepare coatings which do not suffer from this defect.

SUMMARY OF THE INVENTION

The present invention relates to heat-curable coating compositions containing

A) a prepolymer having an average of 2-4 ketoxime-blocked NCO groups, having an average molecular weight of 500-15,000 and prepared from aliphatic, cycloaliphatic and aromatic polyisocyanates and one or more polyhydroxy components which contain a total portion of ethylene oxide units of 0-30% by weight, preferably 5-20% by weight, it being possible, if several polyhydroxy components are used, for the proportion of ethylene oxide in one of the components to be up to 70% by weight, preferably up to 50% by weight, and
B) a crosslinking agent of the formula

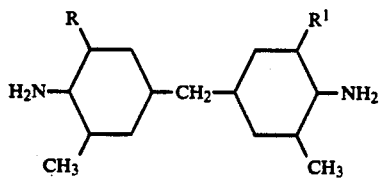

wherein R and $R^1$ represent H or $C_1$-$C_4$-alkyl, the ratio of equivalents of blocked NCO groups in A) to $NH_2$ groups in B) being 1.35:1 to 0.95:1, characterized in that at least one of the polyhydroxy compounds used for the preparation of the prepolymer contains, in stable dispersion, a polyurethane, a polyurethane-urea and/or a polyurea, which virtually no longer contain free NCO groups, hydroxyl groups or amino groups and which are synthesized from aromatic, aliphatic and/or cycloaliphatic diisocyanates and from diamines, hydrazine and/or diols, provided that at least one of these components carries a radical having hydrophilic characteristics.

The present invention also relates to the use of these coating compositions in a process for the coating, particularly water vapor-permeable coating, of substrates, preferably textile sheet-like structures and leather.

DETAILED DESCRIPTION OF THE INVENTION

Suitable radicals which have hydrophilic characteristics include sulphonic acid (salt) groups, carboxylic acid (salt) groups or ethylene oxide ether groups.

The advantages of the heat-curable compositions according to the invention are as follows:

1. High solids content of the spreading pastes, i.e., relatively low solvent content of 0-30 by weight.
2. Long pot-life of the spreading pastes, more than 14 days after addition of the crosslinking agent.
3. Coatings with high solids application per unit of surface area, for example, 50-150 g/m², can be prepared.
4. High water vapor permeability, for example 2-8 g/cm²h, measured in accordance with IUP15 in combination with a high solids application, 3000-5000 g/m²d, measured with a Lyssy L 80/4000 unit at 35° C. and a relative humidity difference of 65%
5. High water impermeability of the coating article after washing and/or dry cleaning.
6. Excellent "drop resistance," i.e., no "pimple-shaped" swelling occurs when water drops are placed on the polyurethane (PUR) layer.
7. Little abrasion of the compact coating surface.
8. No use of environmentally damaging precipitation bath fluids such as those used for the coagulation of DMF solutions in water.
9. Normal spreading, doctor blade application and drying techniques, in contrast to the difficult spreading and drying conditions used for the preparation of water vapor-permeable, microporous coatings by the evaporation/coagulation process.

Aromatic, aliphatic and cycloaliphatic diisocyanates, as described in detail in DE-A 2 457 387 (U.S. Pat. No. 4,035,213, herein incorporated by reference), are suitable for synthesis of the ketoxime-blocked NCO-prepolymers (A). 2,4'- or 4,4'-diisocyanatodiphenylmethane, the isomeric toluylene diisocyanates and in particular mixtures of these diisocyanates are preferred. Preferred cycloaliphatic diisocyanates are 4,4'-diisocyanatodicyclohexylmethane and isophorone diisocyanate.

The compounds to be reacted with the diisocyanates include those described in DE-A 2 550 796, U.S. Pat. No. 4,147,680 (herein incorporated by reference) and DE-A 2 513 815. These compounds contain, as a stable dispersion, a polyurethane, polyurethane-urea and/or polyurea containing groups having hydrophilic characteristics.

The dispersions are based on polyhydroxy components which contain 0-30% by weight, preferably 5-20% by weight, of ethylene oxide units. It is possible for individual polyhydroxy compounds to contain of up to 70% by weight, preferably up to 50% by weight, of ethylene oxide units. Examples include polyhydroxy compounds which have 2-4 hydroxyl groups and a molecular weight of 500-10,000, preferably 1000-6000, as determined by end group analysis. These polyhydroxy compounds are described in detail in the previously mentioned publications.

The polyhydroxy compounds preferably come from the following classes: polyethers containing 2-3 hydroxyl groups, such as propylene oxide polyethers, ethylene oxide polyethers, propylene oxide/ethylene oxide mixed polyethers and mixtures of propylene oxide polyethers and ethylene oxide polyethers; polyesters containing 2-3 hydroxyl groups, preferably having a molecular weight of 1000-6000; and mixtures of polyhydroxy polyethers such as those set forth above and polyhydroxy polyesters. The polyhydroxy polyesters include hydroxypolyesters prepared from adipic acid, hexane-1,6-diol and neopentyl glycol and having a molecular weight of 1000 to 3000 and hydroxypolycarbonates prepared from diphenyl carbonate and hexanediol, hydroxyethoxyhexanol and/or hydroxypolycaprolactone.

The proportion of polyether in the mixtures is preferably 40-100% by weight, more preferably 70-100% by weight.

The dispersed polyurethanes, polyureas or polyurethane-ureas to be used in accordance with the present invention are preferably produced in situ in the polyhydroxy compounds. It is also possible to produce these polymers externally and to mix them into the polyhydroxy compounds. The dispersed hydrophilic products are prepared from aromatic, aliphatic and/or cycloaliphatic polyisocyanates and aliphatic diamines, cycloaliphatic diamines, diaminopolyethers having a molecular weight of 500-3000, hydrazine hydrate, hydrazides, dihydroxycarboxylic acids, glycols, dihydroxypolyethers having a molecular weight of 500-3000, diaminoalkyl sulphonic acids and their salts, diaminocarboxylic acids and their salts and mixtures of any of these compounds.

The in situ preparation of the hydrophilic polyurethanes, polyureas and in particular polyurethane-ureas in the polyhydroxy compounds is preferred.

Suitable starting raw materials for preparing the polyurethanes, polyurethane-ureas and/or polyureas produced in situ in the polyhydroxy compounds include diisocyanates such as isomer mixtures of toluylene diisocyanate or diphenylmethane diisocyanate, hexane diisocyanate or isophorone diisocyanate, preferably the 80:20 mixture of 2,4/2,6-toluylene diisocyanate and difunctional isocyanate-reactive compounds such as isophoronediamine, 4,4,-diaminodicyclohexylmethane, 4,4'-diamino-3,3'-dimethyl-dicyclohexylmethane, $\omega,\omega$-diaminopolyethylene oxide, carbodihydrazide, semicarbazide propionic acid hydrazide, preferably hydrazine hydrate, ethylene glycol, diethylene glycol, propylene 1,3- or -1,2-glycol, butanediol, hexane-1,6-diol, neopentyl glycol, aminoethanol, aminopropanol, dimethylolpropionic acid, ethylene diamine-$\beta$-ethyl-sulphonic acid, ethylene diamine-propyl sulphonic acid or ethylenediamine-butylsulphonic acid, 1,2- or 1,3-propylenediamine-$\beta$-ethylsulphonic acid, glutamic acid, lysine, 3,5-diaminobenzoic acid and the alkali metal and/or ammonium salts of these acids. The salts are preferably present in an amount of 5 to 100 mole percent of the isocyanate-reactive components used to prepare the polyurethanes, polyurethane-ureas and polyureas. The amount of the hydrophilic components are preferably selected to provide ratio of hydrophilic polyurethanes, polyurethane-ureas and polyureas to hydrophobic polyurethanes, polyurethane-ureas and polyureas of 95:5 to 10:90.

In the preparation of the NCO prepolymers it is also possible to use low molecular diols having a molecular weight of less than about 300 such as the known chain extenders. In this connection butane-1,4-diol and hexane-1,6-diol are preferred.

The preparation of the NCO-prepolymers is carried out in known manner by reacting the polyhydroxy compounds which contain a dispersed polyurethane, polyurethane-urea or polyurea and which may be in admixture with a low molecular diol with excess diisocyanate, preferably at about 70°-110° C. Preferably, an NCO/OH equivalent ratio of 1.5:1 to 6.0:1, more preferably 1.7:1 to 2.5:1, is chosen for this reaction.

Suitable blocking agents for the NCO prepolymers include ketoximes of hydroxylamine and ketones such as acetone, methyl ethyl ketone, diethyl ketone, cyclohexanone, acetophenone and benzophenone.

The preferred blocking agent is methyl ethyl ketoxime (butanone oxime). The blocking reaction is carried out, for example, by reacting the NCO-prepolymer preferably with stoichiometric amounts of ketoxime at elevated temperature, for example at 70°-100° C., until the NCO groups have been reacted.

4,4'-diamino-3,3'-dimethyl-dicyclohexylmethane, an aliphatic diamine which has a very low vapor pressure and is liquid at room temperature, is preferably used as crosslinking component B) for the blocked NCO prepolymers.

The ratio of the equivalents of blocked NCO groups in A) to NH$_2$ groups in B) in the coating compositions according to the invention is preferably 1.25:1 to 1:1.

The compositions according to the invention are used in particular for coating textile sheet-like structures and leather. A particular advantage is that water vapor-permeable coatings can be produced with the aid of these compositions. Accordingly the invention also relates to a process for the coating, particularly water vapor-permeable coating, of substrates, preferably textile sheet-like structures and leather, which process is characterized in that the compositions according to the invention are used.

The water vapor-permeable coatings can be prepared applying the heat-curable reactive mixtures with coating equipment which is known in the industry, either by the direct coating process or by the reverse coating process. Depending upon the particular chemical structure of the NCO prepolymer, it is possible to produce coatings having different properties, such as adhesive coatings, intermediate coatings or top coats.

To prepare a reverse coating from the products according to the invention the reactive mixture for the top coat is first applied to a suitable intermediate substrate, for example, a release paper, in an amount of about 30-100 g/m$^2$, and cured in a drying channel. The reactive mixture for the adhesive coating is applied to the dry top coat, also in an amount of about 30-100 g/m$^2$, and the substrate is bonded to the adhesive coat. The coating is then cured in a further drying channel at about 120°-190° C., preferably 150°-160° C., and the coated substrate is detached from the release-substrate. It is possible to produce only the top coat or the adhesive coat from the coating compositions according to the invention and to use a conventional coating system or a different type of water vapor-permeable coating system for the other coat.

As previously mentioned, the reactive mixtures may also be applied directly onto the textile substrate using a direct spreading process.

The coating compositions according to the invention may also be blended with 1- or 2-component polyurethanes which are present in solution or as dispersions in water. See, for example, DE-A 2,457,387 (U.S. Pat. No. 4,035,213, herein incorporated by reference) and DE-A 3,134,161 (U.S. Pat. No. 4,652,466, herein incorporated by reference). The polyurethane used for this purpose can be hydrophobic or hydrophilic.

If intermediate coats are prepared from the coating materials according to the invention, then compounds which release gas upon heating may optionally be added as blowing agents; foam stabilizers may also be added. Suitable additives are described, for example, in DE-A 1,794,006 (GB-A 1,211,339) and in U.S. Pat. No. 3,262,805.

The invention is further illustrated but is not intended to be limited by the following examples in which all parts and percentages are by weight unless otherwise specified.

EXAMPLES

Example 1 a) Preparation of a hydrophilic polyurea dispersion in a polyether 1000 g/min of a polyether having an OH number of 35 and prepared from trimethylolpropane, propylene oxide and ethylene oxide (ratio by weight 82:18), 104 g/min of a mixture of 80% 2,4-toluylene diisocyanate and 20% 2,6-toluylene diisocyanate and a mixture of 50 g/min of hydrazine hydrate and 114 g/min of sodium ethylenediamine-$\beta$-ethylsulphonate (70% aqueous solution) were fed continuously at room temperature into two spiked stirrers arranged in series, operating at 15,000 revolutions/min and having chamber volumes of 1.5 l and 0.5 l, respectively. The three components were separately introduced directly into the mixing zone of the first spiked stirrer. The polyether was fed from the storage tank via a geared pump, while the two low viscosity components were fed from separate storage vessels via piston metering pumps. The exothermic polyaddition reaction took place in the spiked stirrers. The reaction temperature was adjusted to 100°–105° C. by cooling the spiked stirrers. A virtually completely reacted white dispersion left the second spiked stirrer after a dwell time of about 2 minutes. The dispersion was transferred into a holding vessel, where it was held, with stirring, at 80° to 100° C. After further stirring, the water originating from the hydrazine hydrate and the diamine was distilled off at 100° C. under vacuum. A stable, white, fine, approximately 20% dispersion having an OH number of 27.2, a viscosity of 1600 mPas/25° C. and a pH value of 8.0 was obtained.

b) Preparation of the blocked high-solid prepolymer with hydrophilic polyurea 1000 g of the polyurea dispersion described under a) were initially introduced. 65 g of a polyether prepared from Bisphenol A and propylene oxide, OH number 220, were added to the dispersion and the resultant mixture was reacted (3 hours) at 80° C. with a mixture of 91 g of 4,4'-diphenylmethane diisocyanate and 63 g of 2,6-toluylene diisocyanate to form an NCO prepolymer. After diluting with 143 g of methoxypropyl acetate, the NCO groups were reacted, i.e., blocked, at 80° C. with 69 g of butanone oxime; blocked NCO content: 2.1%.

c) Preparation of the spreading paste 1000 g of the 90% solids prepolymer described under b) were mixed with 90 g of titanium dioxide, 20 g of Aerosil 200 filler and 100 g of Solvesso 100, an aromatic hydrocarbon mixture, and milled. 59 g of 4,4'-diamino-dimethyl-dicyclohexylmethane were added to this mixture as a crosslinking agent. The spreading paste has a viscosity of approximately 30,000 mPas/25° C.

d) Preparation of a coated article using the transfer process

The spreading paste described in c) was applied to a commercially available matt release-paper using a doctor blade, gap 0.08 mm, drying and crosslinking at 140°–160° C.

An adhesive coating paste containing 1000 g of the 50% adhesive coating solution described in DE-A 3 736 652 Example 3, 40 g of a crosslinking agent based on a hexamethoxy/butoxymelamine resin (70% in i-butanol) and 10 g of a 20% solution of p-toluenesulphonic acid in i-propanol as catalyst was applied to the top coat using a doctor blade, gap 0.1 mm. A cotton woven fabric weighing 160 g/m² was bonded to the adhesive coating paste. The crosslinking of the adhesive coating was carried out at 140° C. The total coating applied was approximately 60 g/m² of solid.

The soft, voluminous, water vapor permeable article had the following fastness properties:

| WVP-Lyssy*: | 4000 g/m² d |
|---|---|
| Water column: | |
| Original | 2000 mm |
| 3 washings | 2000 mm |
| 3 dry cleanings | 2000 mm |
| Bally flexometer: | |
| RT | 200,000 bends |
| −10° C. | 50,000 bends |

*(WVP = water vapor permeability)

Drop test:

When water drops were allowed to act on the top surface of the coating for 1-5 min, no pimple-like change in the surface was observed.

Comparative Example to 1 c/a) Blocked high-solid prepolymer without hydrophilic polyurea 800 g of the trifunctional polyether described in Example 1a were initially introduced and mixed with 60 g of a polyether prepared from Bisphenol A and propylene oxide, OH number 220. The polyhydroxy compounds were then reacted with a mixture of 91 g of 4,4'-diphenylmethane diisocyanate and 63 g of 2,6-toluylene diisocyanate as described in Example 1b to provide an NCO-prepolymer. After dilution with 120 g of methoxypropyl acetate, the NCO-prepolymer was blocked at 80° C. with 69 g of butanone oxime.

c/b) Preparation of the spreading paste 1000 g of the 90% solids prepolymer described in c/a were pigmented, filled, diluted and milled as described in Example 1c. 70 g of 4,4'diaminodimethyldicyclohexyl methane were added to this milled product as crosslinking agent. The spreading paste had a viscosity of approximately 27,000 mPas/25° C.

c/c) Preparation of a coating article using the transfer process

A coating article was prepared as described in Example 1d using the spreading paste c/b as top coat. The water vapor permeability of the comparative article of 1800 g/m² d as measured by the Lyssy method was not commercially acceptable.

The impermeability, measured as water column, was 2000 mm. Example 2 a) Preparation of a hydrobhilic polyurea dispersion in a polyether

A dispersion of a polyurea in a polyether was prepared as described in Example 1a, using 1000 g/min of a polyether having an OH number of 37 and prepared from glycerol and propylene oxide, 81 g/min of hydrazine hydrate, 197 g/min of sodium ethylenediamine-μ-ethylsulphonate and 180 g/min of toluylene diisocyanate (2,4/2,6=80:20). An approximately 30% dispersion having an OH number of 26 was obtained.

b) Preparation of a blocked high solid prepolymer with hydrophilic polyurea 1000 g of the polyurea dispersion described in Example 2a were initially introduced and 53 g of a polyether prepared from Bisphenol A and propylene oxide, OH number 220, were added. The mixture was reacted at 100° C. with a mixture of 80 g of 4,4'diphenylmethane diisocyanate and 55 g of 2,6-toluylene diisocyanate to provide an NCO prepolymer. The mixture was diluted with 140 g of Solvesso 100 and the NCO groups were blocked at 80° C. with 60 g of butanone oxime; NCO content: 2.3%.

c) Preparation of the spreading paste (top coat)

1000 g of the 90% solids prepolymer described in Example 2b were pigmented, filled, diluted and milled as described in Example 1c. 65 g of 4,4'-diaminodicyclohexylmethane were added to the milled mixture as crosslinking agent. The spreading viscosity of the paste was approximately 25,000 mPas/25° C.

d) Preparation of the adhesive coating paste 500 g of a dihydroxypolycarbonate having OH number of 56 and prepared by reacting ω'-hydroxyhexyl-ω-hydroxy-capronate with diphenyl carbonate, 500 g of a dihydroxy polyether prepared from equimolar amounts of ethylene oxide and propylene oxide, OH number 56, 18 g of butanediol and 23.6 g of hexanediol were reacted in 965 g of toluene with 244 g of toluylene diisocyanate (2,4/2,6 isomer ratio=65:35) at 90°–100° C. After dilution with 320 g of methyl ethyl ketone, the reaction was terminated with 5 g of butanone oxime. Viscosity of the solution at 25° C.: 32,000 mPas.

40 g of the crosslinking agent and 10 g of the catalyst described in Example 1d were added to 1000 g of this 50% solution.

e) Preparation of a coated article

A coated article was prepared from the top coat described in Example 2c and the adhesive coating described in Example 2d using the transfer process described in Example 1d. The soft, voluminous, water vapor-permeable article had the following fastness properties:

| WVP-Lyssy Water column: | 3000 g/m² d |
|---|---|
| Original | 2000 mm |
| 3 washings | 2000 mm |
| 3 dry cleanings | 2000 mm |

The article was drop-resistant, i.e. no pimple-like changes occurred on the surface when exposed to the action of water drops as described in Example 1.

Example 3 a) Preparation of a hydrophilic polyurea dispersion in a polyether

A fine, approximately 20% (after removal of the water) dispersion having a hydroxyl number of 29 was prepared as described in Example 1a from 1000 g of the polyether described in Example 2a; a diamine mixture containing 15 g of hydrazine hydrate, 59 g of sodium ethylene diamine ethyl sulphonate and 56 g of a linear, ethylene oxide polyether containing primary amino end groups and having an average molecular weight of 2000; and 124 g of isophorone diisocyanate.

b) Preparation of a blocked high-solid prepolymer having hydrophilic polyurea 1000 g of the polyurea dispersion described in Example 3a were used to prepare a blocked NCO prepolymer having an NCO content of 2.1% (blocked) as described in Example 2b using the same components and the same weight ratios.

c) Preparation of a spreading paste (top coat)

1000 g of the 90% solids prepolymer described in Example 3b were pigmented, filled, diluted and milled as described in Example 1c. 59 g of 4,4'-diamino-dimethyl-dicyclohexylmethane were added to the milled mixture as crosslinking agent. The flow viscosity of the dispersion was approximately 32,000 mPas.

d) Preparation of an adhesive coating paste 700 g of hexanediol polyadipate (OH number 133) and 300 g of an ethylene glycol polyether (OH number 56) were reacted with 174 g of 2,4/2,6-toluylene diisocyanate in the presence of toluene, at 100° C. The resultant solution was freed from solvent using an evaporating screw. After extrusion and cooling, the PUR melt was granulated.

300 g of these granules were dissolved in 700 g of ethyl acetate to form a solution having a viscosity of 35,000 mPas/25° C. In order to effect crosslinking, 50 g of a 75% solution in ethyl acetate of a polyisocyanate based on toluylene diisocyanate and having an NCO content of 13% were added. Additionally, 50 g of a 10% solution of tertiary aminourethane (prepared by reacting N-methyl-diethanolamine with phenylisocyanate) in a 1/1 blend by weight of toluene/methyl ethyl ketone were added to catalyze the crosslinking reaction.

e) Preparation of a coated article using the transfer process

1) A coated article was prepared from the top coat described in Example 3c and the adhesive coating described in Example 3d using the transfer process described in Example 1d.

The coated article had the following fastness properties:

| WVP-Lyssy Water column | 3500 g/m² d |
|---|---|
| Original | 2000 mm |
| 3 washings | 2000 mm |
| 3 dry cleanings | 1800 mm |

The article was drop-resistant as described in Example 1.

2) A coated article was prepared from the top coat described in Example 3c and the adhesive coating described in Example 3d using the transfer process described in Example 1d with the exception that the substrate was split leather.

Split leather was placed in adhesive coating 3d while this was still wet with solvent. The split leather was pressed out and the solvent was evaporated at 80°–90° C. After 2 days storage at RT the coated split leather had a water vapor permeability of 2 g/cm² h when measured by IUP 15. Comparative example to 3)

c/a) Blocked high solids prepolymer without hydrophilic polyurea 800 g of the polyether having an OH number of 37 described in Example 2a were initially introduced and mixed with 53 g of a polyether prepared from Bisphenol A and propylene oxide, OH number of 220. The mixture was then reacted at 100° .C with 80 g of 4,4'-diphenylmethane diisocyanate and 59 g of 2,6-toluylene diisocyanate. After diluting with Solvesso 100 solvent to 90% solids, the NCO-prepolymer was blocked with butanone oxime; blocked NCO content: 2.5%.

c/b) Preparing the spreading paste

After pigmenting as in Example c/b-1, 70 g of 4,4'-diamino-dimethyl-dicyclohexylmethane were added to 1000 g of prepolymer c/a-2. Viscosity of the spreading paste: 25,000 mPas/25° C.

c/c) Preparation of a coated article

A coated article was prepared on
1. textile
2. split leather as described in Example 3e using top coat c/b-2 and the adhesive coating described in Example 3d.

| WVP/Lyssy for textile: | 1600 g/m² d |
|---|---|
| WVP/IUP 15 for leather: | 0.1 g/cm² h |

Example 4 a) Preparation of a hydrophilic polyurea dispersion in a polyether

A hydrophilic polyurea was prepared in situ in 1000 g of the trifunctional polyether described in Example 1a by reacting 24 g of hydrazine hydrate and 8.1 g of sodium glutaminate in 12 g of water with 87.7 g of toluylene diisocyanate (2,4/2,6 isomer ratio 80:20) and the water was removed under vacuum.

b) Preparation of a blocked high solids prepolymer containing hydrophilic polyurea 800 g of the polyurea dispersion described in Example 4a were initially introduced and mixed with 36.1 g of a polyether prepared from Bisphenol A and propylene oxide, OH number 220. The polyhydroxy compounds were reacted at 100° C. with a mixture of 38.1 g of 2,4/2,6-toluylene diisocyanate (isomer ratio 80:20) and 54.7 g of 4,4'-diphenylmethane diisocyanate to provide an NCO-prepolymer. After dilution with 108 g of methoxypropyl acetate, the prepolymer was blocked at 80° C. with 41.9 g of butanone oxime; NCO content: 1.2% (blocked).

c) Preparation of the spreading paste 1000 g of the 90% solids prepolymer described in Example 4b were pigmented as described in Example 1c. 34 g of 4,4-diamino-dimethyl-dicyclohexylmethane were added to effect crosslinking. The spreading paste had a viscosity of 32,000 mPas/25° C.

d) Preparation of a coated article

A coated article was prepared using the transfer process described in Example 1d using the top coat paste described in Example 4c and the adhesive coating described in Example 1d. The soft, water vapor-permeable article has a pleasant handle and the following fastness properties:

| WVP-Lyssy | 4500 g/m² d |
|---|---|
| Water column: | |
| Original | 2000 mm |
| 3 washings | 2000 mm |
| 3 dry cleanings | 2000 mm |
| Bally flexometer | |
| RT | 200,000 bends |
| −10° C. | 50,000 bends |

No changes were observed when water drops were applied to the coating surface.

Example 5 a) Preparation of a hydrophilic polyurethane dispersion in a polyether

A 20% urea dispersion was prepared as described in Example 1a from 1000 g of the trifunctional polyether described in Example 2a, 33.8 g of hydrazine hydrate and a prepolymer prepared from 152.8 g of toluylene diisocyanate (2,4:2,6 isomer ratio 80:20) and 70.3 g of a linear polyether having an OH number of 56 and based on ethylene oxide and propylene oxide in a weight ratio of 1:1.

b) Preparation of a blocked high solids prepolymer containing hydrophilic polyurethane 6253 g of the polyurea dispersion in polyether prepared in Example 5a were initially introduced and mixed with 621 g of a polyether prepared from Bisphenol A and propylene oxide, OH number 220. The mixture was reacted with a mixture of 940 g of 4,4'-diphenylmethane diisocyanate and 650 g of toluylene diisocyanate (2,4/2,6 isomer ratio 80:20) at 100° C. After diluting the mixture with 1020 g of methoxypropyl acetate, the NCO groups were blocked with 720 g of butanone oxime; blocked NCO content: 2.9%, viscosity: 50,000 mPas/25° C.

c) Preparation of a spreading paste 1000 g of the 90% solids, blocked NCO-prepolymer described in Example 5b were pigmented, filled, diluted and milled as described in Example 1c. 82 g of 4,4'-diamino-dimethyl-dicyclohexylmethane were added to the milled mixture as a crosslinking agent.

d) Preparation of a water vapor permeable coating

The spreading paste described in Example 5c was applied using a doctor blade with a gap of 0.1 mm to a commercially available smooth, matt release-paper.

Evaporation of the solvent and crosslinking were carried out at 100°-120° to 150°-160° C.

The WVP coating had a weight of 70 g/m² and a WVP as measured by the Lyssy method of 3300 g/m²d.

Example 6 a) Preparation of a hydrophilic polyurethane-urea dispersion in a polyether 1000 g of the trifunctional polyether described in Example 2a were initially introduced. 429.2 g of a polyurethane-urea prepared from 61.4 g hydrazine hydrate, 72.9 g of N-methyldiethanolamine and 317.1 g of toluylene diisocyanate (2,4/2,6 isomer ratio 80:20) were finely dispersed in the polyether; OH number approximately 40.

b) Preparation of a blocked high solids prepolymer 715 g of the polyurethane-urea dispersion in polyether described in Example 6a were mixed with 69 g of a polyether prepared from Bisphenol A and propylene oxide, OH number 220. This mixture was reacted at 100° C. with a mixture of 94 g of 4,4'-diphenylmethane diisocyanate and 65 g of toluylene diisocyanate (2,4/2,6 isomer ratio 80:20). After diluting the mixture with 112 g of methoxypropyl acetate, the NCO groups were blocked with 65 g of butanone oxime; blocked NCO content: 2.8%, viscosity: 40,000 mPas/25° C.

c) Preparation of the spreading paste 1000 g of the 90% solids prepolymer described in Example 6b were pigmented, diluted and milled as described in Example 1c. 79 g of 4,4'-diamino-dimethyl-dicyclohexylmethane were added to the milled mixture as crosslinking agent.

d) Preparation of a coating Using the spreading paste described in Example 6c, a coating was prepared using the procedure described in Example 5d. WVP as measured by the Lyssy method: 3500 g/m² d at a film weight of 80 g/m².

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat-curable coating composition comprising
A) a prepolymer which has an average of 2-4 ketoxime-blocked NCO groups and an average molecular weight of 500-15,000 and which is prepared from
   i) an aliphatic, cycloaliphatic or aromatic polyisocyanate and
   ii) a polyhydroxy component having an average ethylene oxide content of 0 to 30% by weight and comprising at least one polyhydroxy compound containing a stable dispersion of a member selected from the group consisting of polyurethanes, polyurethane-ureas and polyureas, which are substantially free from NCO groups, hydroxyl groups and amino groups and which are based on the reaction product of a) a diisocyanate having aromatically-, aliphatically- and/or cycloaliphatically-bound isocyanate groups and b) a compound selected from the group consisting of diamines, hydrazine, diols and mixtures thereof, wherein at least one of these compounds contains a hydrophillic group and iii) a ketoxime blocking agent, and B) a crosslinking agent of the formula

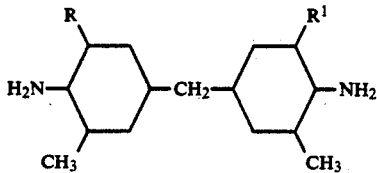

wherein R and $R^1$ represent H or $C_1$-$C_4$-alkyl group, the equivalent ratio of blocked NCO groups in A) to $NH_2$ groups in B) being 1.35:1 to 0.95:1.

2. The composition of claim 1 wherein component a), comprises a toluylene diisocyanate or isophorone diisocyanate; component b) comprises isophoronediamine or hydrazine hydrate; and the hydrophilic group is present in a compound selected from the group consisting of diaminopolyethers having ethylene oxide units, dihydroxy polyethers having ethylene oxide units, and alkali metal and ammonium salts of dimethylolpropionic acid, ethylene diamine ethyl sulphonic acid, glutamic acid and lysine.

3. The composition of claim 1 wherein component B) comprises 4,4'-diamino-3,3'-dimethyl-dicyclohexylmethane.

4. The composition of claim 1 wherein 5-100 mole percent of component b) comprises a salt of a dihydroxycarboxylic acid, a diaminoalkylsulphonic acid, a diaminocarboxylic acid or mixtures thereof.

5. The composition of claim 1 wherein the ratio of hydrophilic polyurethanes, polyurethane-ureas and polyureas to hydrophobic polyurethanes, polyurethane-ureas and polyureas is 95:5 to 10:90.

6. The composition of claim 1 wherein the solids content is 70-100 % by weight.

7. The composition claim 1 wherein polyhydroxy component ii) comprises a mixture of a polyhydroxy polyether and a polyhydroxy polyester.

8. The composition of claim 7 wherein 30 to 99% by weight of the mixture comprises a polyhydroxy polyether.

9. The composition of claim 1 wherein component a) comprises a mixture of 2,4- and 2,6-toluylene diisocyanate in an isomer ratio of 80:20 and component b) comprises a mixture of hydrazine hydrate and sodium ethylene diamine-$\beta$-ethylsulphonate.

10. A water vapor-permeable coating prepared from the composition of claim 1.

* * * * *